United States Patent

Nishimura

[11] Patent Number: 5,831,944
[45] Date of Patent: Nov. 3, 1998

[54] MAGNETOOPTICAL RECORDING MEDIUM AND METHOD FOR REPRODUCING INFORMATION FROM A MAGNETOOPTICAL RECORDING MEDIUM HAVING THREE LAYERS

[75] Inventor: Naoki Nishimura, Tokyo, Japan

[73] Assignee: Canon Kabushiki Kaisha, Tokyo, Japan

[21] Appl. No.: 858,206

[22] Filed: May 13, 1997

Related U.S. Application Data

[63] Continuation of Ser. No. 389,579, Feb. 15, 1995, abandoned, which is a continuation-in-part of Ser. No. 111,974, Aug. 26, 1993, abandoned.

[30] Foreign Application Priority Data

Feb. 26, 1993 [JP] Japan .................................. 5-038138
Feb. 21, 1994 [JP] Japan .................................. 6-022653

[51] Int. Cl.$^6$ .................................................. G11B 11/00
[52] U.S. Cl. ...................................... 369/13; 428/694 ML
[58] Field of Search .......................... 369/13, 14, 275.3, 369/275.2, 283, 284, 110, 112; 360/59, 114; 428/694 ML, 694 DE, 694 RL, 694 MM, 694 EC, 694 GR, 694 RE

[56] References Cited

U.S. PATENT DOCUMENTS

| | | | |
|---|---|---|---|
| 5,241,520 | 8/1993 | Ohta et al. | 369/13 |
| 5,278,810 | 1/1994 | Takashi et al. | 369/13 |
| 5,325,344 | 6/1994 | Ohta et al. | 369/13 |
| 5,428,585 | 6/1995 | Hirokane et al. | 369/13 |
| 5,477,528 | 12/1995 | Murakami | 369/275.3 |
| 5,486,395 | 1/1996 | Murakami et al. | 369/13 X |
| 5,616,428 | 4/1997 | Nishimura et al. | 428/694 ML |

FOREIGN PATENT DOCUMENTS 0524745 2/1993 European Pat. Off. .

*Primary Examiner*—Ali Neyzari
*Attorney, Agent, or Firm*—Fitzpatrick, Cella, Harper & Scinto

[57] ABSTRACT

A magnetooptical recording medium has a first magnetic layer which is an in-plane magnetization film at both room temperature and high temperatures and changed to a perpendicular magnetization film at intermediate temperatures, and a second magnetic layer which is composed of a perpendicular magnetization film. The recording medium enables realization of high S/N reproduction of information recorded at a pitch below the diffraction limit of light with a simple structure, and further improvement in linear recording density and track density.

2 Claims, 14 Drawing Sheets

INTERFACE MAGNETIC WALL

INTERFACE MAGNETIC WALL

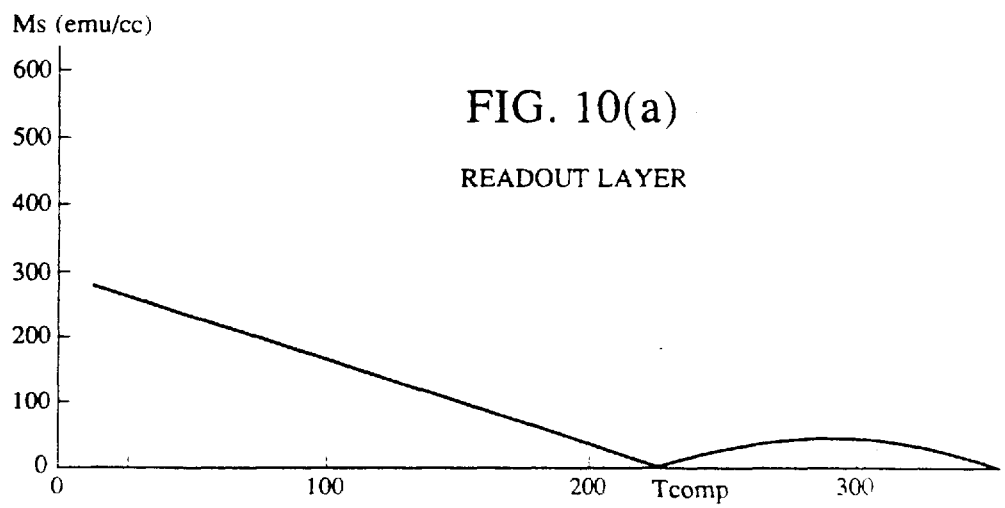
FIG. 10(a) READOUT LAYER
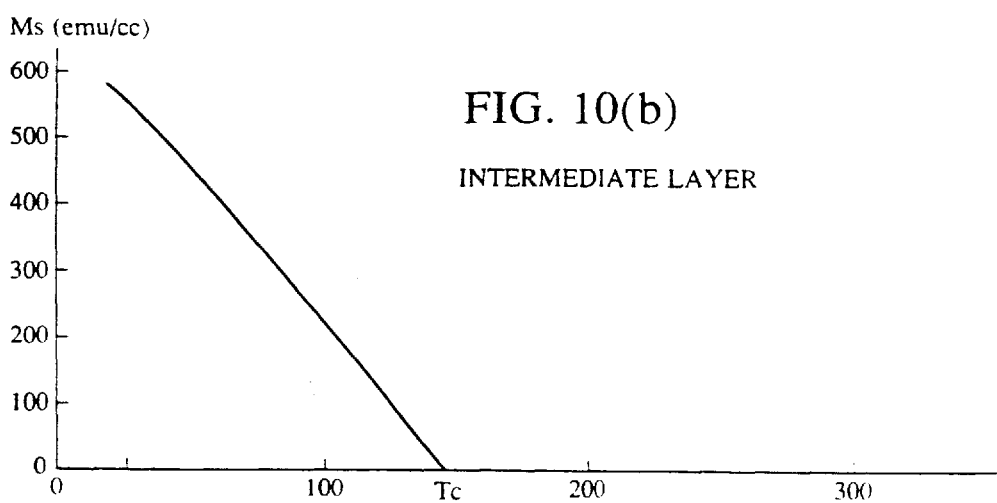
FIG. 10(b) INTERMEDIATE LAYER
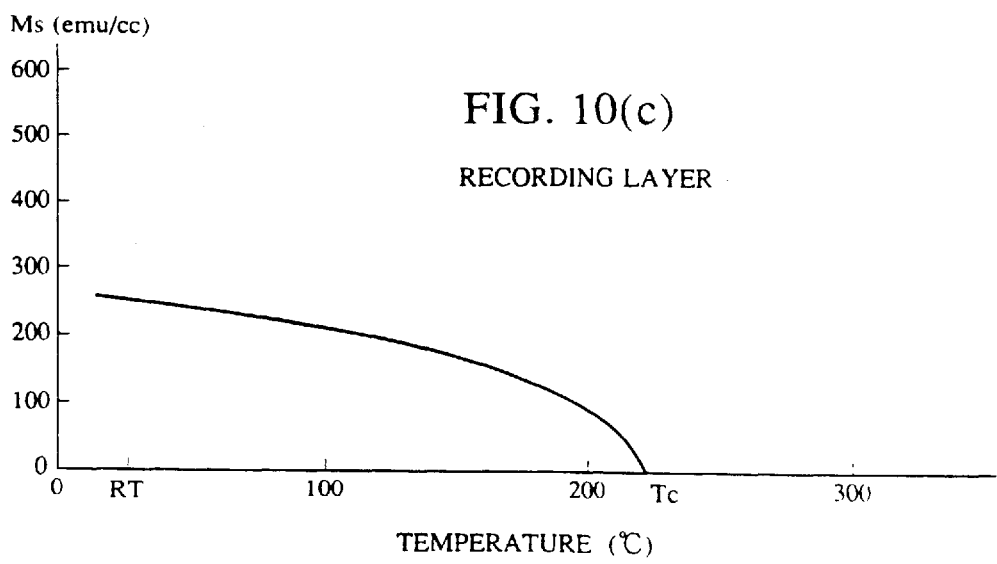
FIG. 10(c) RECORDING LAYER

MAGNETOOPTICAL RECORDING MEDIUM AND METHOD FOR REPRODUCING INFORMATION FROM A MAGNETOOPTICAL RECORDING MEDIUM HAVING THREE LAYERS

This application is a continuation of application Ser. No. 08/389,579 filed Feb. 15, 1995, now abandoned, which in turn is a continuation-in-part of application Ser. No. 08/111,974 filed Aug. 26, 1993, now abandoned in favor of continuation application Ser. No. 08/643,833 filed May 7, 1996, which issued as U.S. Pat. No. 5,616,428 on Apr. 1, 1997.

BACKGROUND OF THE INVENTION

1. Field of the Invention

The present invention relates to a magnetooptical recording medium allowing information recording and reproduction by irradiation with a laser beam, utilizing magneto-optic effect, and particularly to a magnetooptical reproducing method and magnetooptical recording medium which enables a higher-density medium by improving linear recording density and track density.

2. Related Background Art

In recent years, a magnetooptical recording medium has become a subject of attention in the field of a rewritable recording method of high recording density. In such a recording method, information or data is recorded in the recording medium by forming a magnetic domain in a magnetic film of the medium by means of thermal energy of a laser beams emitted from a semiconductor laser, and information is read out from the medium, utilizing magneto-optical effect. The above-noted trend is based on need for a larger amount of recording capacity to be achieved by higher recording density of such a recording medium.

By the way, the linear density of an optical disc, such as a magnetooptical recording medium, is largely dependent on the wavelength of a laser beam and the numerical aperture of an objective lens used in an optical system for reproducing information. When the wavelength $\lambda$ of a laser beam used in a reproducing optical system and the numerical aperture NA of an objective lens are determined, a bit or pit periodicity or pitch is defined as $\lambda/2NA$ which is a minimum scale or limit of detection.

Track density of the optical disc is, on the other hand, chiefly limited by crosstalk. The crosstalk is largely dependent on a laser beam distribution or profile on a medium surface and is expressed as a function of $\lambda/2NA$, similar to the bit periodicity mentioned above. Thus, the wavelength of a laser beam must be shortened and the numerical aperture NA of an objective must be enlarged in order to increase the recording density of the conventional optical disc.

However, there are limitations to improvement of the wavelength of a laser beam and the numerical aperture of an objective. Techniques therefor have been developed, which improve the structure of a recording medium and a method of reading out data bits so that the linear recording density can be improved.

For example, Japanese Patent Laid-Open No. 3-93058 discloses a method for improving the linear recording density and track density. The process is performed in the following sequence. First, a recording medium, which comprises a readout layer and a recording layer, is prepared. After the direction of magnetization in the readout layer is oriented in a single direction prior to information reproduction, then information held in the recording layer is transferred to the readout layer. Thus, it becomes possible to reduce interference between codes at the time of information reproduction and to reproduce information recorded at a pitch below the diffraction limit of light (magnetic super-resolution).

However, the magnetooptical reproducing method of Japanese Patent Laid-Open No. 3-93058 requires a step of aligning the magnetization direction of the readout layer in a predetermined direction, which is conducted before projection of a laser beam onto the readout layer. Thus, it is necessary to add a magnet for initializing the readout layer to a conventional apparatus. Due to such addition, problems arise, such as more complicated structure of a magnetooptical recording apparatus, difficulty of down-sizing, and higher cost of an apparatus.

The inventors previously proposed a method for realizing magnetic super-resolution by a simple film structure without the need for an external magnetic field at the time of reproduction. This method uses a magnetooptical recording medium comprising two layers including a readout layer which is an in-plane magnetization film at room temperature and changed to a perpendicular magnetization film at raised or high temperatures, and a recording layer which is composed of a perpendicular magnetization film. In this method, for realizing magnetic super-resolution, the readout layer is used as an in-plane magnetization film within a low-temperature area in a light spot, and as a perpendicular magnetization film within a high-temperature area for transferring magnetization information stored in the recording layer and reproducing the information.

However, in such a super-resolution medium comprising the in-plane magnetization film, only the high-temperature area within a light spot is a reproducable area. It is thus difficult to stably provide a reproduction area having a predetermined space, and signal output is possibly decreased because the reproduction area is at the edge of the light spot.

SUMMARY OF THE INVENTION

In consideration of the above problems, it is an object of the present invention to provide a magnetooptical recording medium which enables realization of high S/N reproduction of information recorded at a pitch below the diffraction limit of light with a simple structure, and a method for reproducing information using the recording medium.

The object is attained by a magnetooptical recording medium comprising a first magnetic layer which is an in-plane magnetization film at both room temperature and raised or high temperatures and changed to a perpendicular magnetization film at intermediate temperatures, and a second magnetic layer which is composed of a perpendicular magnetization film.

Further, the object is attained by a method of reproducing, by using a laser beam, information recorded on a magnetooptical recording medium comprising a first magnetic layer which is an in-plane magnetization film at both room temperature and raised or high temperatures and changed to a perpendicular magnetization film at intermediate temperatures, and a second magnetic layer which is composed of a perpendicular magnetization film. The method comprises a step of projecting the laser beam on the recording medium from the side of the first magnetic layer, a step of changing both low-temperature and high-temperature areas within a light beam projection portion of the first magnetic layer to an in-plane magnetization film, and an intermediate-temperature area thereof into a perpendicular magnetization film, a step of performing exchange coupling of the perpendicular magnetization of the first magnetic layer and the magnetization of the second magnetic layer to transfer the information recorded on the second magnetic layer to the first magnetic layer, and a step of reproducing the recorded information based on the magneto-optic effect of light reflected from the recording medium.

The recording medium and reproducing method will be described in detail below with reference to embodiments.

BRIEF DESCRIPTION OF THE DRAWINGS

FIGS. 10(a) through 10(c) is a graph illustrating the temperature dependencies of Ms when an intermediate layer is provided between a readout layer and a recording layer according to the present invention.

DESCRIPTION OF THE PREFERRED EMBODIMENTS

A magnetooptical recording medium and reproducing method using the recording medium of the present invention are described in detail below with reference to the drawings. Hereinafter, a first magnetic layer, a second magnetic layer and a third magnetic layer are referred to as a readout layer, a recording layer and an intermediate layer, respectively.

The magnetooptical recording medium of the present invention is composed of at least two layers: a readout layer and a recording layer. The readout layer remains an in-plane magnetization film at room temperature, is changed into a perpendicular magnetization film when the temperature is raised, and is changed into an in-plane magnetization film or eliminates magnetization when the temperature is further raised. The recording layer remains a perpendicular magnetization film not only at room temperature but also at raised temperatures. The above-described states of the readout layer and the recording layer are states when these layers are laminated.

The readout layer is preferably composed of, for example, a rare-earth and iron group amorphous alloy, such as GdCo, GdFeCo, GdTbFeCo, GdDyFeCo or NdGdFeCo. By "iron group" is here meant the elements Fe, Co, and Ni. Material having small magnetic anisotropy and compensation temperature between room temperature and Curie temperature is preferable.

The recording layer is preferably composed of material having large perpendicular magnetic anisotropy and being capable of stably maintaining the magnetized state, for example, a rare earth and iron group amorphous alloy, such as TbFeCo, DyFeCo or TbDyFeCo; garnet; or a platinum group and iron group periodical structure layer, such as Pt/Co or Pd/Co; or a platinum group and iron group alloy, such as PtCo or PdCo. By "platinum group" is here meant the elements Ru, Rh, Pd, Os, Ir, and Pt. Further, an element for improving corrosion resistance, such as Cr, Al, Ti, Pt, Nd or the like, may be added to each of the readout and recording layers as the magnetic layers.

Dielectric, such as SiNx, AlNx, TaOx, SiOx or the like, may be added to the readout and recording layers in order to improve interference effect. Material for improving thermal conductivity, such as Al, AlTa, AlTi, AlCr, Cu or the like, may be provided.

An intermediate layer for adjusting exchange coupling force or magnetostatic coupling force, or an auxiliary layer for assistance of recording or reproduction may be formed. A protecting coating, which is composed of the above-discussed dielectric or polymer resin, may be used as a protective film.

The following description deals with the recording-reproducing method of the present invention.

Figure 1:
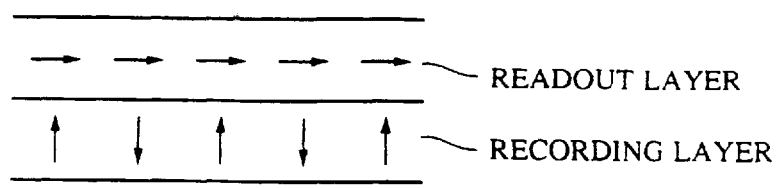
FIG. 1 is a schematic view showing a film structure in accordance with an embodiment of the present invention.
Figure 2:
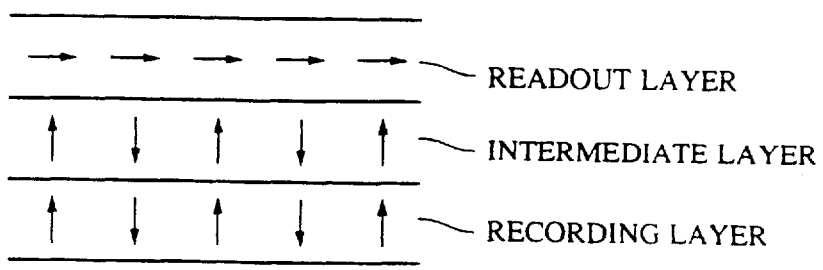
FIG. 2 is a schematic view showing a film structure in accordance with another embodiment of the present invention.

Referring to FIG. 1, data signals are first recorded in the recording layer of the magnetooptical recording medium of the present invention. One way of recording data signals in the recording layer is to modulate an external magnetic field while projecting a laser beam powerful enough to raise the temperature of the recording layer to over Curie temperature. Another way is to modulate laser power while applying a magnetic field in the recording direction, after eliminating data in the recording layer. The other way is to modulate a laser power while applying an external magnetic field.

When the intensity of the laser beam is determined so that the temperature of a predetermined region within a beam spot is raised close to Curie temperature of the recording layer, considering the linear velocity of the recording medium, a recording magnetic domain, which is less than the diameter of the laser beam spot, is formed. As a result, it is possible to record signals having a periodicity less than the diffraction limit of light.

Figure 5:
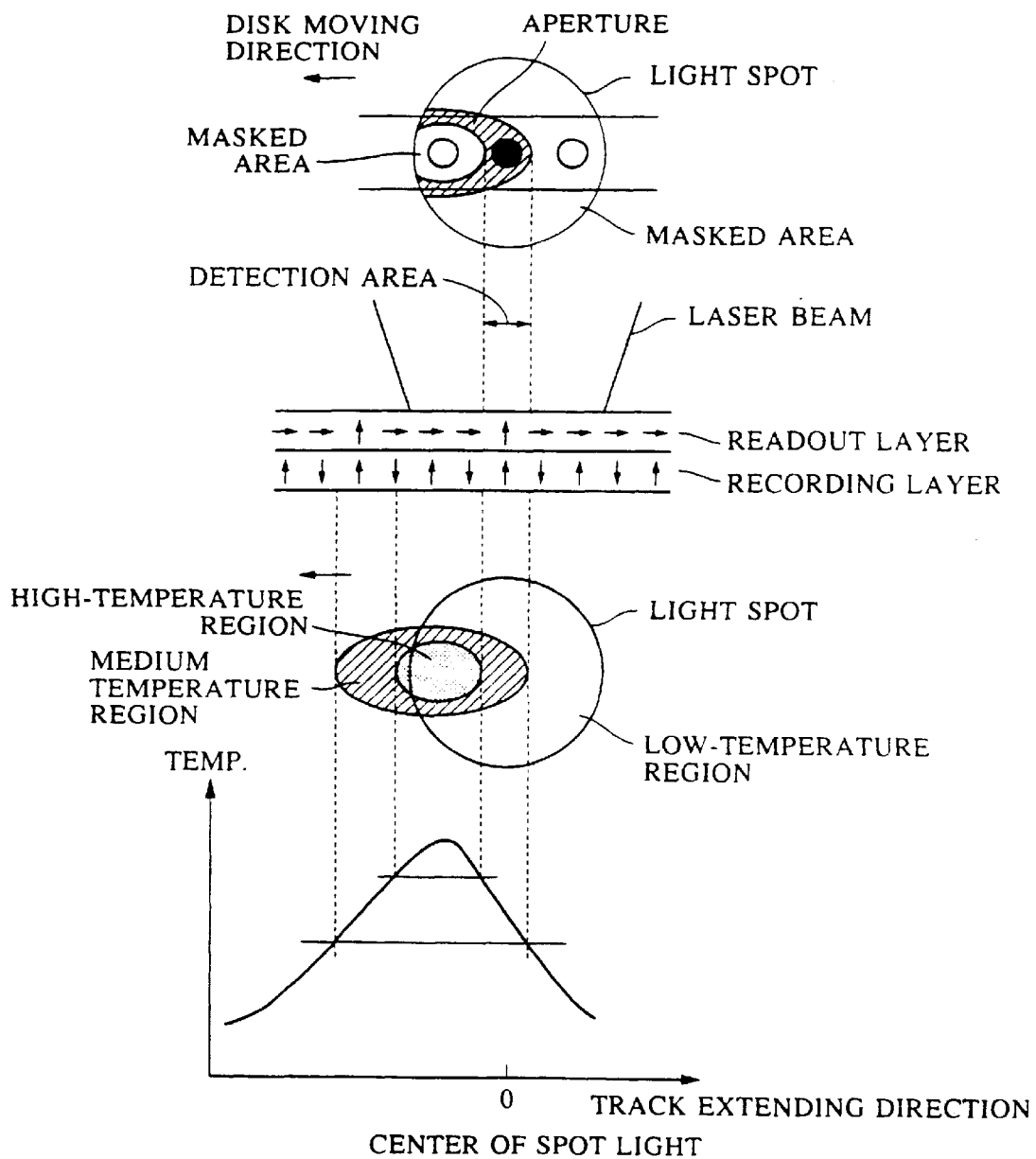
FIG. 5 is a schematic view illustrating an example of an information reproducing method of the present invention.
Figure 9:
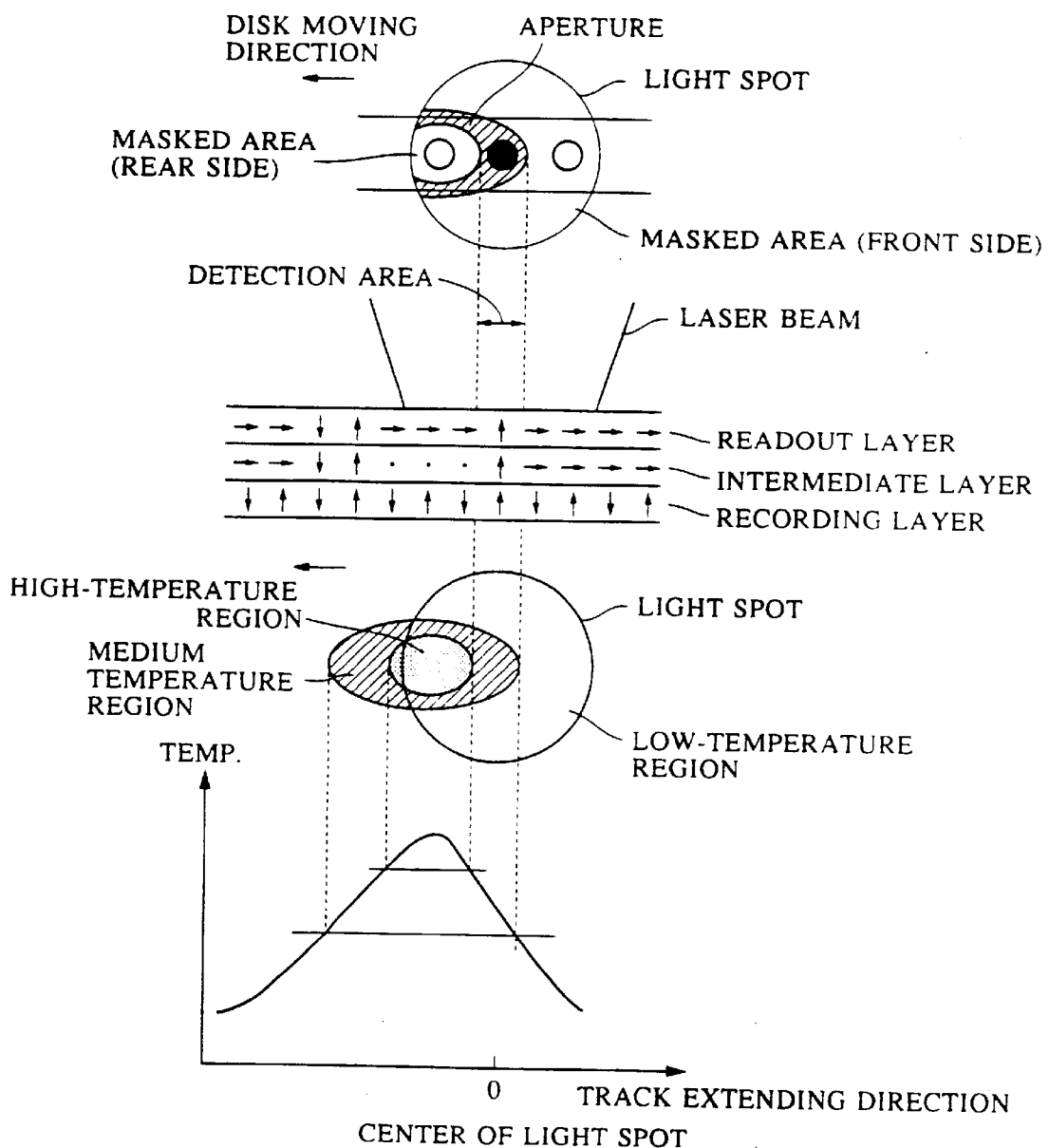
FIG. 9 is a schematic view illustrating another example of an information reproducing method of the present invention.
Figure 11:
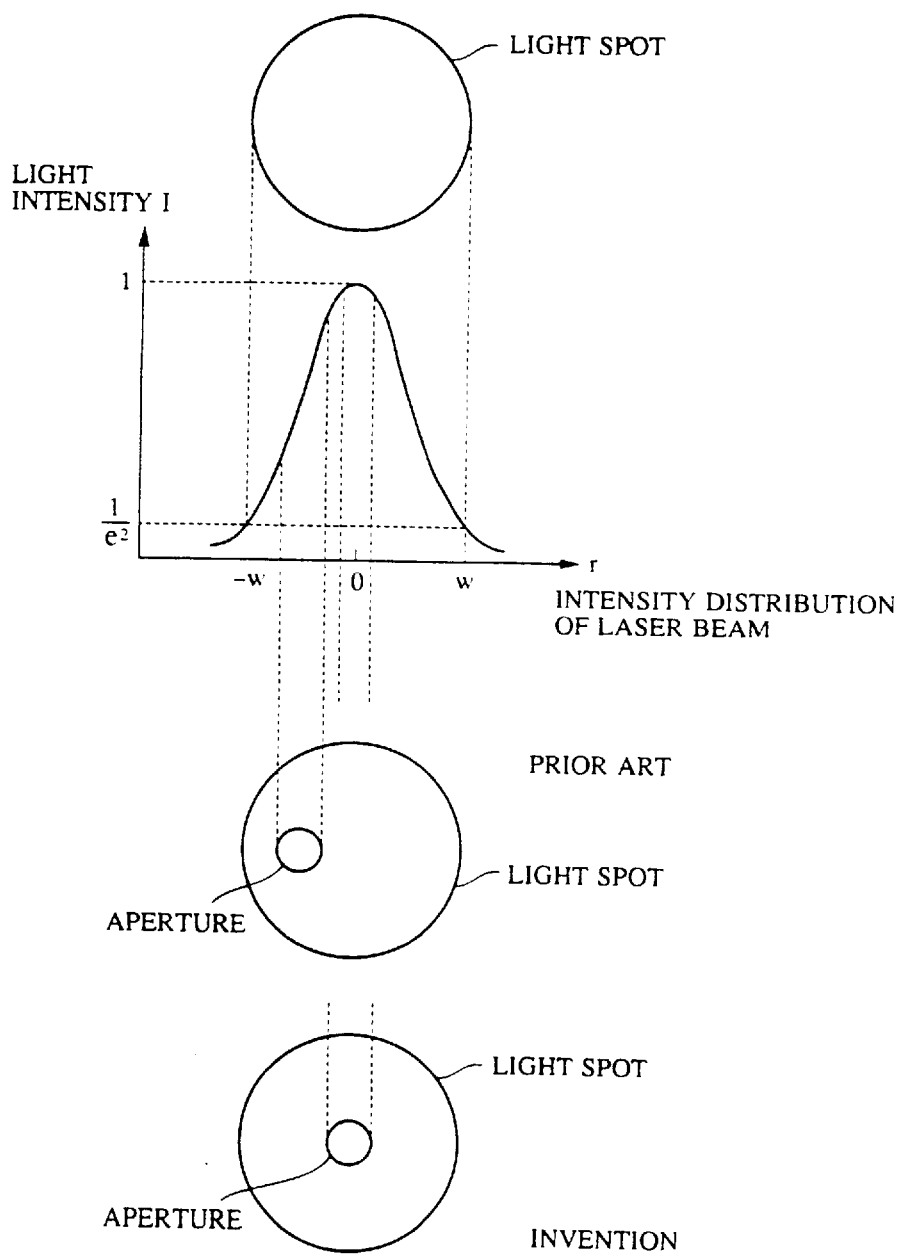
FIG. 11 is a schematic view illustrating the relation between the beam intensity of a light spot and detection region within the light spot.

When reproducing the data signal, a readout laser beam is projected onto the recording medium. At this time, however, the temperature in the region, irradiated with the beam, rises. Since the medium moves at a constant speed, the temperature distribution on the recording medium has a shape extending along the moving direction of the recording medium, as shown in FIG. 5 or 9. In the temperature distribution, a part within the beam spot is a high-temperature area.

A two-layer structure magnetooptical recording medium basically comprising the readout layer and the recording layer of the present invention is first described below.

With regard to a magnetic thin film comprising a single layer, it is known that a chief magnetization direction is determined by an effective perpendicular magnetic anisotropy constant K⊥ that is defined by the following equation 1:

$$K\perp = Ku - 2\pi Ms^2 \quad (1)$$

wherein Ms is the saturation magnetization of the magnetic thin film, and Ku is the perpendicular magnetic anisotropy constant. When K⊥ is positive, the magnetic film becomes a perpendicular magnetization film. When K⊥ is negative, the magnetic film becomes an in-plane magnetization film. Here, $2\pi Ms^2$ is energy of demagnetizing field.

Figure 4:
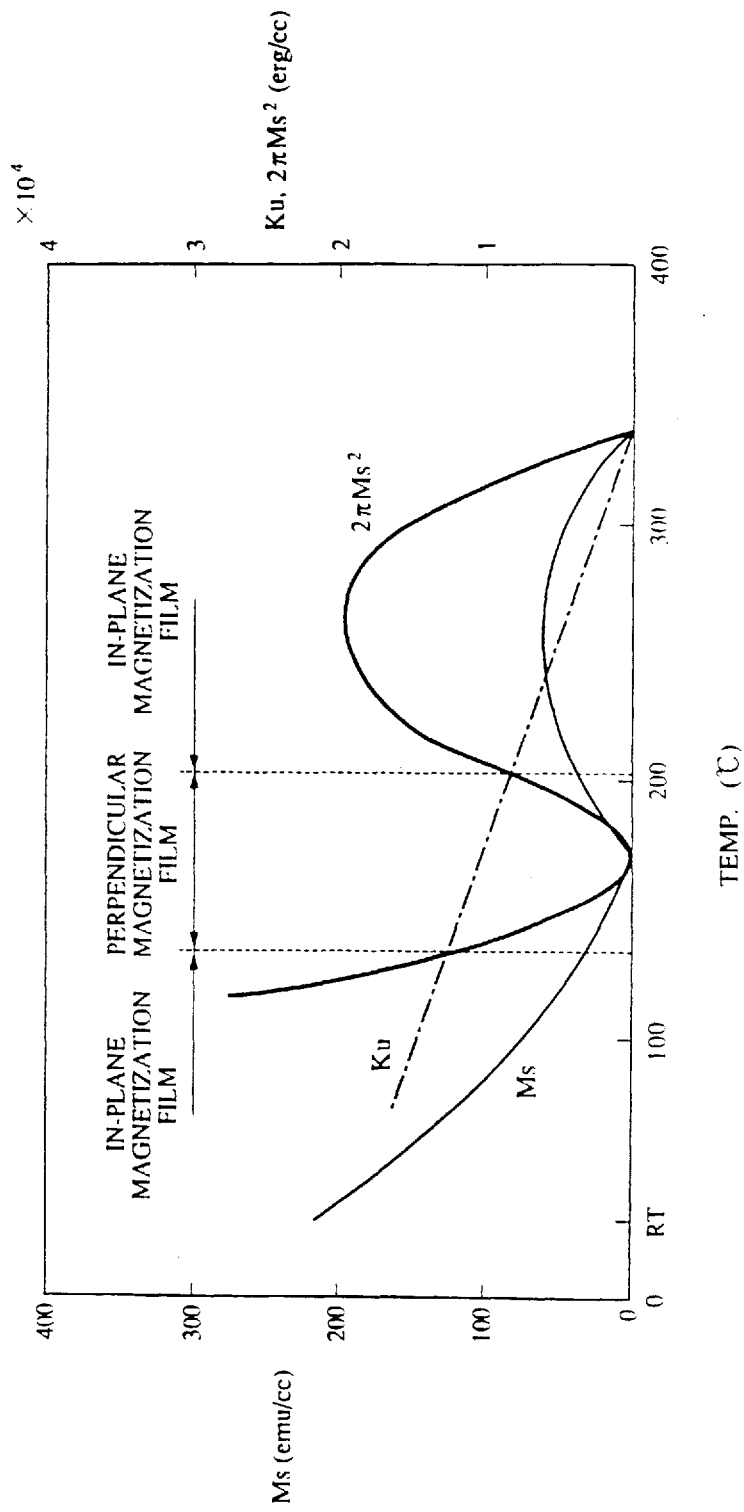
FIG. 4 is a graph illustrating an example of the temperature dependencies of $2\pi Ms^2$ and perpendicular magnetic anisotropy constant Ku of a readout layer.

For example, when the magnetic film has temperature dependency of Ms and Ku as shown in FIG. 4, the magnetic film is an in-plane magnetization film since the following equation 2 is established:

$$Ku < 2\pi Ms^2, \ K\perp < 0 \quad (2)$$

However, at the time of information reproduction, Ms of the readout layer decreases since the temperature increases. Thus, $2\pi Ms^2$ rapidly decreases and becomes smaller than the perpendicular magnetic anisotropy constant Ku, as shown by the following relation 3:

$$Ku > 2\pi Ms^2, \ K\perp > 0 \quad (3)$$

As a result, the readout layer becomes a perpendicular magnetization film.

When the temperature further increases, the relation between $2\pi Ms^2$ and Ku is again reversed after compensation temperature, and the following relation 4 is again obtained:

$$Ku < 2\pi Ms^2, \ K\perp < 0 \quad (4)$$

As a result, the readout layer again becomes an in-plane magnetization film.

Namely, a state is realized in which the readout layer becomes an in-plane magnetization film in the highest-temperature and low-temperature regions within a portion of the light spot, and the readout layer becomes a perpendicular magnetization film in the medium-temperature region thereof, as shown in FIG. 5. Since the readout layer, which is a perpendicular magnetization film, is magnetically coupled to the recording layer due to exchange coupling therebetween, the direction of magnetization in the readout layer is aligned along a stable direction for the magnetization direction of information recorded in the recording layer. Thus, the information recorded in the recording layer is transferred into the readout layer. The transferred information is converted into an optical signal by magneto-optic effect (magneto-optic effect (polar Kerr effect) of a laser beam reflected from the readout layer) of the readout layer, and detected. Namely, the information is detected by detecting the light reflected from the readout layer. In this case, the magneto-optic effect (polar Kerr effect) would not occur in a portion within the light spot where the readout layer is an in-plane magnetization film.

Thus, as shown in FIG. 5, a masked region for masking magnetization information in the recording layer, and an aperture region for detecting the information are formed within the light spot. Since the aperture region can be formed to have an area smaller than the light spot, signals having a periodicity below the diffraction limit of light can be detected, thereby increasing the linear density.

Since it is also possible to mask a mark on an adjacent track, the density of the adjacent track can be improved.

Although a case of magnetic coupling due to exchange coupling between the readout layer and the recording layer is described above, it is possible that the recording layer is magnetically coupled to the readout layer due to magnetostatic coupling at the time of reproduction. When the readout layer and the recording layer are layered directly or with an intermediate layer therebetween, Ku apparently increases due to the exchange coupling force or magnetostatic coupling force applied from the perpendicular magnetization film, and thus the temperature region serving as a perpendicular magnetization film shifts to a lower temperature side, compared with a case where the readout layer and recording layer are not layered. If presetting a perpendicular magnetization temperature region in a single layer film at a slightly higher value, even when the readout layer is layered with the perpendicular magnetization layer, it is possible that the readout layer is an in-plane magnetization film at room temperature and high temperatures, and shifts into a perpendicular magnetization film only in the medium temperature region.

Masking may be achieved at the highest-temperature point or region by disappearance of magnetization in the readout layer. However, the signal level in readout might be slightly reduced because Curie temperature Tc of the readout layer needs to be lower than Curie temperature Tc of the recording layer.

Figure 6:
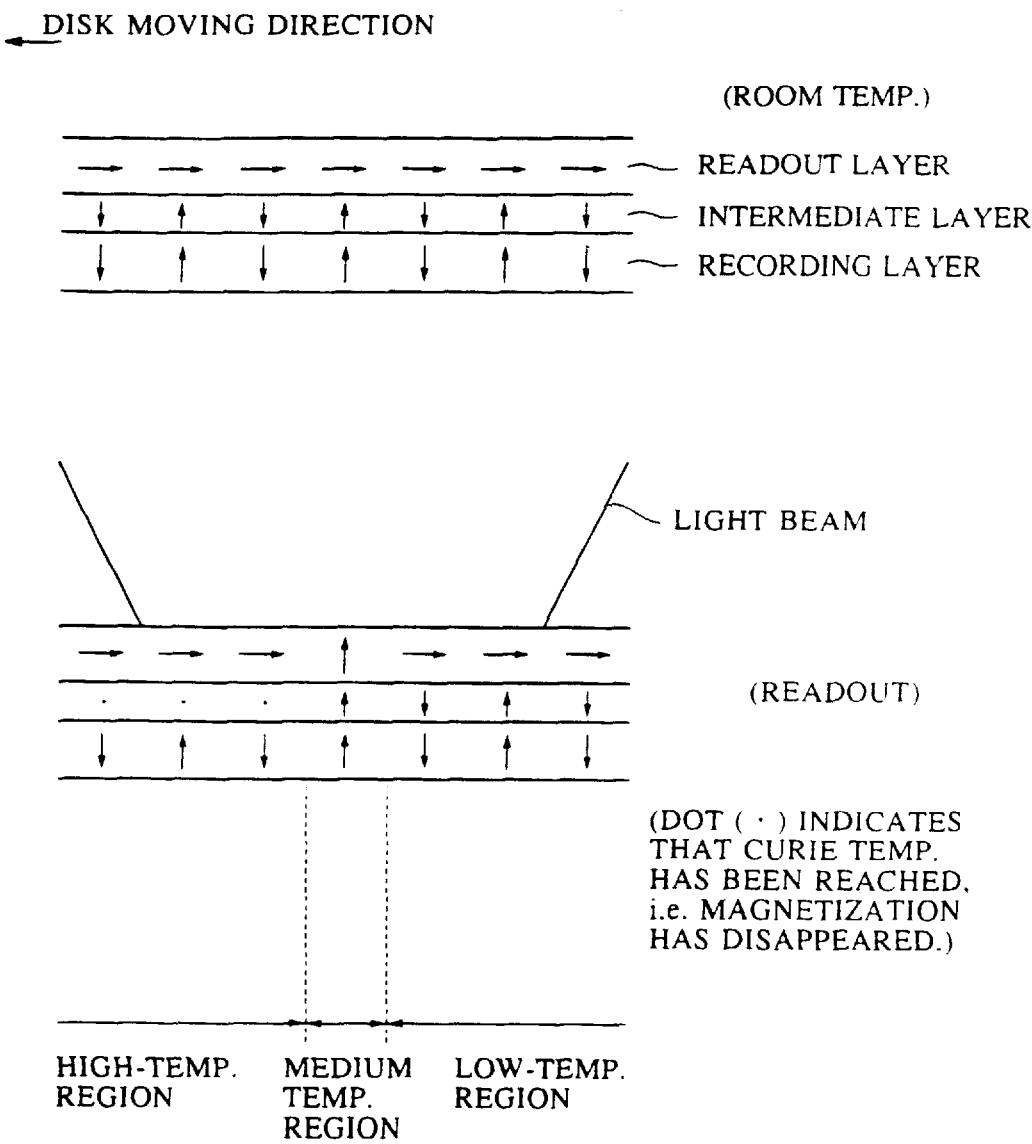
FIG. 6 is a schematic view illustrating a magnetized situation when an intermediate layer is provided between a readout layer and a recording layer according to the present invention.

The following is an example of an improved magnetooptical recording medium of the present invention, which contains an intermediate layer between a readout layer and a recording layer as shown in FIG. 6, and thus basically comprises three magnetic film layers.

In this example, the intermediate layer is interposed between the readout layer and the recording layer, and Curie temperature of the intermediate layer is higher than room temperature and lower than Curie temperatures of the readout and recording layers. Material for the intermediate layer may be a rare-earth and iron group amorphous alloy, such as TbFe, GdFe, TbFeCo or GdFeCo, or such an alloy into which a non-magnetic element such as Al, Cu and Cr or added.

When the readout layer and the recording layer are layered, the exchange coupling force from the recording layer acts in a direction to make the spin (magnetization) direction of the readout layer perpendicular. Thus, the perpendicular magnetic anisotropy of the readout layer apparently increases. Although this apparent increase in the perpendicular magnetic anisotropy is omitted in the above description, the effective perpendicular magnetic anisotropy K⊥ will be handled below in consideration of the increase.

Assuming that the thickness of the readout layer is h1, saturation magnetization is Ms, perpendicular magnetic anisotropy constant is Ku, and energy of the interface magnetic domain walls between the readout layer and the recording layer is $\sigma_W$, when the thickness of the interface magnetic domain walls is neglected, an increase in perpendicular magnetic anisotropy of the readout layer due to exchange coupling force is expressed by $\sigma_W/(4h1)$.

Thus, the effective perpendicular magnetic anisotropy constant K⊥ is as follows:

$$K\perp = Ku + \frac{\sigma w}{4h1} - 2\pi Ms^2 \qquad (5)$$

As shown in FIG. 6, the readout layer is subjected to the exchange coupling force from the recording layer at room temperature (RT), but energy of a demagnetizing field is dominant because of large Ms within a low-temperature region near room temperature. As a result, the following relation 6 is obtained, and the readout layer becomes an in-lane magnetization film.

$$Ku + \frac{\sigma w}{4h1} < 2\pi Ms^2, K\perp < 0 \qquad (6)$$

Similar to the above example, in a portion of the magnetooptical recording medium where the temperature increases due to projection of the readout laser beam, Ms of the readout layer decreases, and thus $2\pi Ms^2$ rapidly decreases. As a result, the above relation is reversed, as shown by the following relation 7, and the readout layer becomes a perpendicular magnetization film.

$$Ku + \frac{\sigma w}{4h1} > 2\pi Ms^2, K\perp < 0 \qquad (7)$$

However, in a high-temperature region within the light spot, like at room temperature, the readout layer is an in-plane magnetization film.

The intermediate layer functions as a mediator of exchange coupling force from the recording layer to the readout layer, until its Curie temperature is reached, and information in the recording layer is transferred to the readout layer.

However, in the high-temperature portion within the light spot, the temperature of the intermediate layer reaches its Curie temperature. The intermediate layer has such a composition that Curie temperature is reached, or laser power is set so that Curie temperature is reached. In this portion, thus, the exchange coupling force is eliminated, and the perpendicular magnetic anisotropy constant of the readout layer rapidly decreases in appearance. Therefore, the magnetization direction of the readout layer becomes an in-plane direction again (refer to FIG. 6). Namely, the energy of the interface domain walls between the readout layer and the recording layer becomes 0, and the following relation (8) is obtained:

$$Ku < 2\pi Ms^2, K\perp < 0 \qquad (8)$$

Like the two-layer structure, therefore, only the medium-temperature region becomes an aperture region, thereby realizing super-resolution.

In such a case where the intermediate layer is formed, which has low Curie temperature, the readout layer can be an in-plane magnetization film at room temperature and raised temperatures and be a perpendicular magnetization film at intermediate temperatures therebetween in its layered structure together with the intermediate and recording layers, thought the readout layer has no characteristic that the layer structure in its single layer state returns to an in-plane magnetization film at raised temperatures. Thus, the recording medium comprising the intermediate layer is advantageous in that material can be selected from a wider range.

Since the intermediate layer need not to contribute to the magneto-optic effect, reproduction characteristic do not deteriorate even if Curie temperature is set to a low value.

Figure 7A:
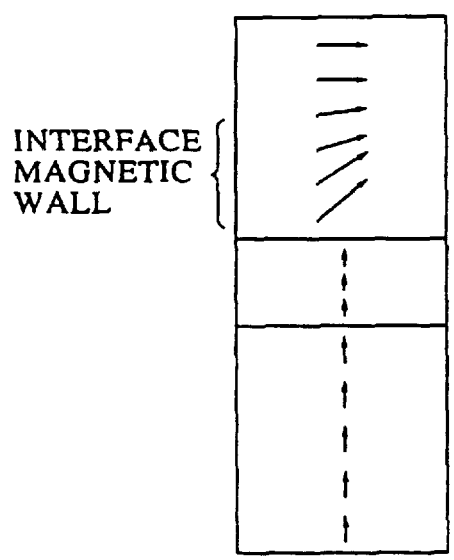
FIGS. 7(a) and 7(b) is a schematic view illustrating a magnetized situation when an intermediate layer with small in-plane anisotropy is provided.
Figure 7B:
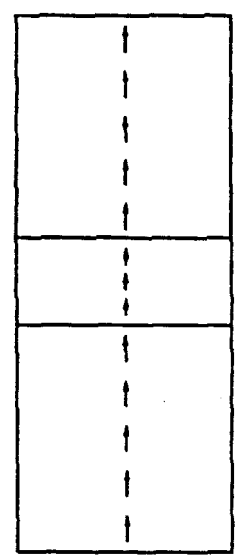

Although, in the above description, it is assumed for convenience sake that the width of the interface magnetic domain walls between the readout layer and the recording layer can be neglected, the above description applies a case where the interface magnetic domain walls enter the readout layer to have a thickness which cannot be neglected. However, when the interface magnetic domain walls between the readout layer and the recording layer occur on the side of the readout layer, magnetization of the recording layer is transferred to a portion of the readout layer, as in the state of spin orientation schematically shown in FIGS. 7(a) and 7(b). If the interface magnetic domain walls become too thick, therefore, it is difficult to completely mask magnetization information recorded in the recording layer. It is thus preferable to thicken the readout layer or increase the in-plane anisotropy in the low-temperature region.

Description will now be made of a case where the above magnetooptical recording medium comprising three magnetic films is improved. In this case, the intermediate layer is interposed between the readout layer and the recording layer, and the Curie temperature thereof is higher than room temperature and lower than Curie temperatures of the readout layer and recording layer. In addition to these conditions, the in-plane anisotropy of the intermediate layer at temperature near room temperature must be larger than that of the readout layer. In order to increase in-plane anisotropy, for example, when rare-earth and iron group alloy is used, rare-earth elements or iron group elements may be predominant so that Ms of the intermediate layer at room temperature is increased.

Figure 8A:
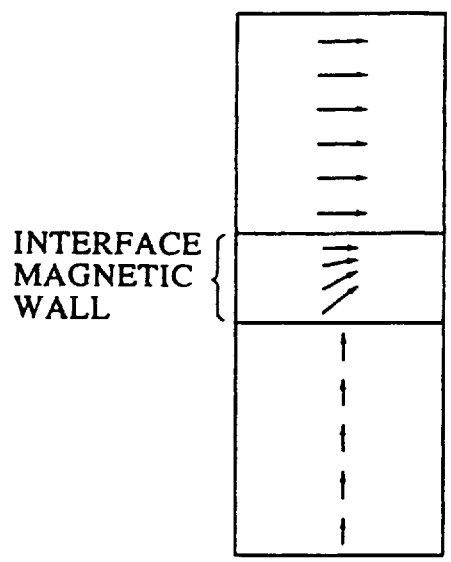
FIGS. 8(a) and 8(b) is a schematic view illustrating a magnetized situation when an intermediate layer with large in-plane anisotropy is provided.
Figure 8B:
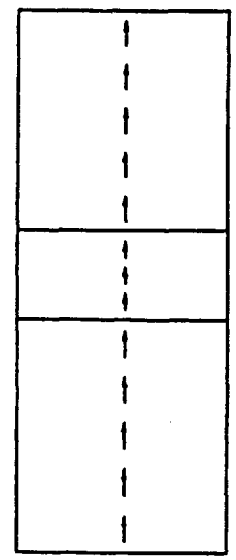

When such an intermediate layer is interposed between the readout layer and the recording layer, the interface magnetic domain walls can be enclosed in the intermediate layer from room temperature to the aperture region, as shown in FIGS. 8(a) and 8(b).

Thus, the readout layer stably becomes an in-plane magnetization film within the low-temperature region, and it is possible to completely mask magnetization information recorded in the recording layer.

If the Curie temperature of the intermediate layer is lower than Curie temperature of the recording layer and higher by a degree which causes no cutting of exchange coupling between the readout layer and the recording layer in the medium-temperature region within the light spot, Ms of the intermediate layer is sufficiently small in the medium-temperature region, and the in-plane anisotropy thereof is decreased, thereby increasing perpendicular magnetic anisotropy. At the readout temperature, even when the intermediate layer itself has no perpendicular magnetic anisotropy, perpendicular magnetic anisotropy can be imparted to the intermediate layer by magnetic coupling force from the recording layer and the readout layer which came to have perpendicular magnetic anisotropy.

In the medium-temperature region, therefore, magnetization of the recording layer is transferred to the readout layer. In the high-temperature region, the temperature of the intermediate layer reaches Curie temperature, and exchange coupling force is eliminated, as described above. As a result, the readout layer becomes an in-plane magnetization film.

As shown in FIG. 9, therefore, the mask region for masking magnetization information recorded in the recording layer, and the aperture region for detecting the magnetization information are formed within the light spot. Since the aperture region can be formed to have an area smaller than the light spot, signals with periodicity below the diffraction limit of light can be detected. Further, as described above, the mask can completely be operated on the front side.

Since a mark on an adjacent track can completely be masked, the density of the adjacent track can further be improved.

In this case, the intermediate layer is preferably formed by using material such as a Gd alloy or the like which has low anisotropy and easily forms interface magnetic domain walls, for example, GdFe, GdFeCo or the like, or the material to which a non-magnetic element such as Al, Cu or Cr is added for decreasing Curie temperature.

The thickness of the intermediate layer may be equal to or more than the thickness of the interface magnetic domain walls between the readout layer as an in-plane magnetization film and the recording layer as a perpendicular magnetization film. On the other hand, if the intermediate layer is too thick, the total thickness of the magnetic layers is increased, thereby necessitating much power for recording. The excessively thick intermediate layer is thus undesirable. The thickness of the intermediate layer is preferably 20 Å to 200 Å, more preferably 50 Å to 150 Å.

In regard to the physical properties of the readout layer, the intermediate layer and the recording layer, assuming that the Curie temperatures of the readout layer, the intermediate layer and the recording layer are T1, T3 and T2; the compensation temperature of the readout layer is Tcomp1; the saturation magnetizations of the readout layer, the intermediate layer and the recording layer are Ms1, Ms2 and Ms3, effective perpendicular magnetic anisotropy constants are K⊥1, K⊥3 and K⊥2; and the energy values of perpendicular magnetic anisotropy is Ku1, Ku3 and Ku2; the following equation (9) is obtained:

$$K\perp = Kui - 2\pi Msi^2 \quad (i=1, 2, 3) \tag{9}$$

At room temperature, the effective perpendicular magnetic anisotropy constants K⊥1, K⊥3 and K⊥2 may have the following relation:

$$K\perp 3 < K\perp 1 << K\perp 2 \tag{10}$$

At room temperature, examples satisfying the above relation are as follows:

$$Ms1 < Ms3 \tag{11}$$

$$Ms2 < Ms3 \tag{12}$$

In addition, as described above, the Curie temperatures must satisfy the relation (13) below.

$$RT \text{ (room temperature)} < Tc3 << Tc1 \tag{13}$$

FIGS. 10(a) through 10(c) shows an example of temperature tendencies of saturation magnetization of the readout layer, the intermediate layer and the recording layer, which satisfy the above conditions.

In order to decrease the in-plane anisotropy of the intermediate layer, as described above, Ms may be increased, or energy of perpendicular magnetic anisotropy Ku may be decreased or made negative (in-plane anisotropy) by adding elements such as Co and the like, which increase in-plane anisotropy.

As described above, in the information reproducing method using the magnetooptical recording medium of the present invention, since a reproducable portion within the laser beam spot is located in a narrow zone between a high-temperature portion and a low-temperature portion, it is possible to reproduce information with high resolution even if the information is recorded in higher density. A higher C/N ratio can also be expected because the detecting region is placed in a center of the laser beam spot. The reason for this is explained hereinafter.

Figure 12:
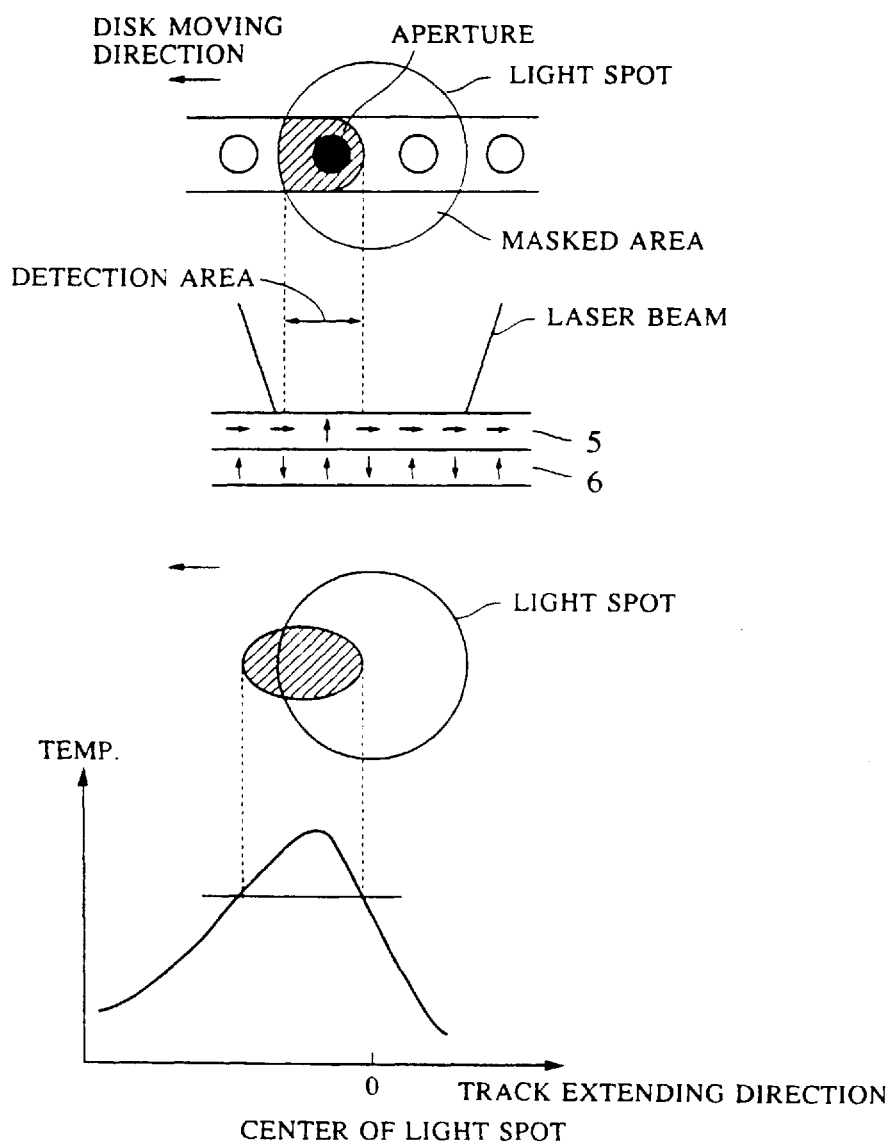
FIG. 12 is a schematic view illustrating an information reproducing method of a comparative example.

Intensity distribution of the laser beam is of a Gaussion type and the intensity at a center thereof is highest. Thus, the closer to the center of the spot a position, where information is reproduced, is, the better the C/N ratio becomes. Generally, the center of the spot is coincident with the center of temperature distribution of the medium when the recording medium moves. The highest temperature point shifts toward the moving direction of the medium. Therefore, when the highest-temperature point is selected as a detectable area, the detecting area will be deviated from the center of the spot (FIG. 12).

Although the present invention is described in detail below with reference to experimental examples, the present invention is not limited to these experimental examples within the scope of the gist of the invention.

(First Experimental Example)

Targets Si, Tb, Gd, Fe, Co, Al and Cu were installed in a DC magnetron sputtering equipment, and a glass substrate was held on a holder. Thereafter, air was vacuum-exhausted from a chamber to establish a high vacuum level of less than $1 \times 10^{-5}$ Pa by using a cryosorption pump.

Ar gas was introduced into the chamber while vacuum-exhausting air, until the level of 0.3 Pa of Ar gas was reached. Then, a SiN layer, which functioned as an interference dielectric film, was deposited to a thickness of 700 Å on the surface of the substrate. A GdFeCo layer was (thickness: 400 Å) was deposited as a readout layer, and a TbFeCo layer (thickness: 400 Å) was deposited as a recording layer. Then, another SiN layer (thickness: 800 Å), which functioned as a protective dielectric film, was deposited to form a magnetooptical recording medium of the present invention having the two-layer structure shown in FIG. 3(a).

When the SiN layer was formed, $N_2$ gas was introduced in addition to the Ar gas and the deposition is performed by DC reactive sputtering. The GdFeCo layer and the TbFeCo layer were formed by applying DC powers to the targets of Gd, Fe, Co and Tb, respectively.

The composition of the GdFeCo layer was adjusted so that its compensation and Curie temperatures were 240° C. and over 400° C., respectively.

The composition of the TbFeCo layer was adjusted to that its compensation and Curie temperatures were less than room temperature and 230° C., respectively.

Figure 13:
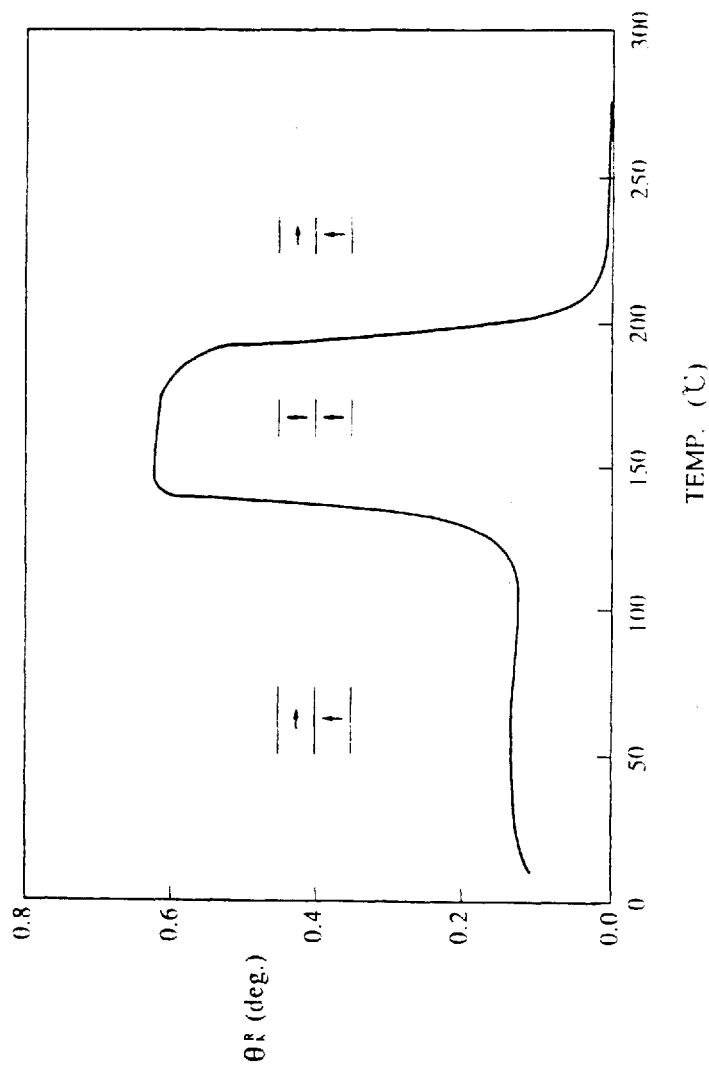
FIG. 13 is a graph illustrating an example of the temperature dependency of a residual $\theta_K$ (when a magnetic field=0) of the recording medium of the present invention.
Figure 14:
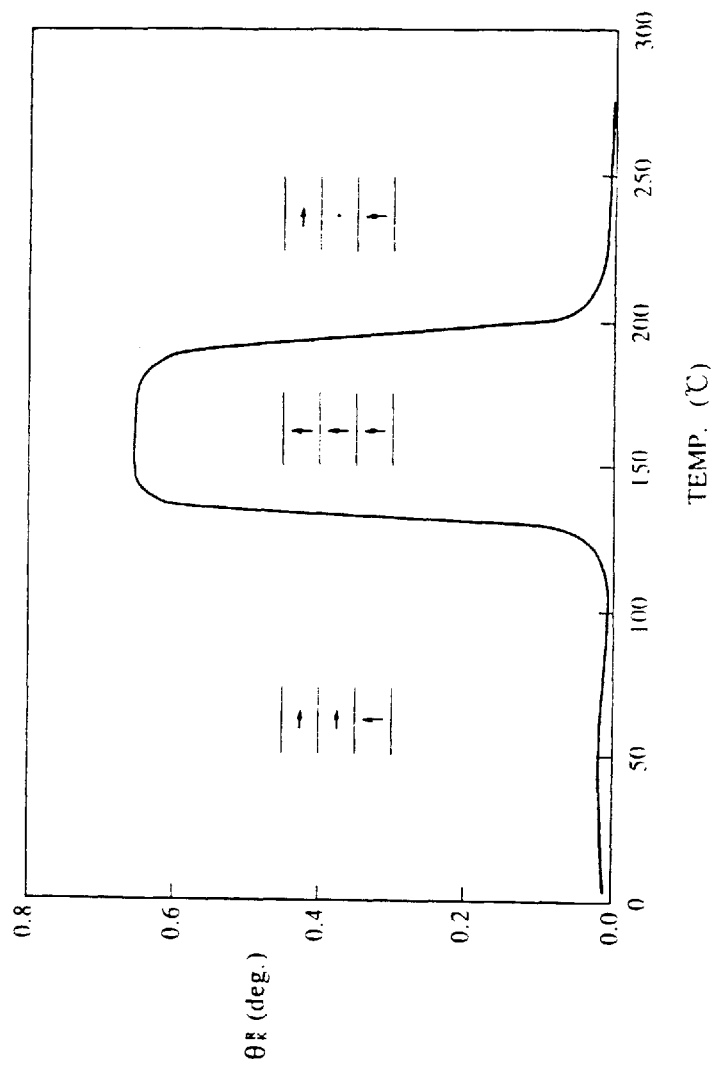
FIG. 14 is a graph illustrating an example of the temperature dependency of a residual $\theta_K$ (when a magnetic field=0) of the recording medium of the present invention.

It was found that Kerr effect (residual Kerr rotation angle), when no magnetic field was applied, appeared only in a temperature range from 130° C. to 180° C., as shown in FIG. 13, and a perpendicular magnetization film was established, by measuring the residual $\theta_K$ at the time of magnetic field=zero as the temperature of the layered films was raised.

(Second Experimental Example)

A magnetooptical recording medium was fabricated, which had the same layer structure as the above first example except that a polycarbonate substrate having a diameter of 130 mm and pregrooves was used.

Results of measurement of recording-reproducing characteristics of the magnetooptical recording medium were as follows. A measuring instrument comprised an objective lens of 0.55 N.A. and a projector for outputting a laser beam of 780 mm wavelength. Power for recording was preset at 8 mW, and linear velocity was 9 m/sec. Then, 6–15 MHz carrier signal was recorded in the recording layer by using a field modulation system in which a magnetic field of ±2000 e was stepwisely applied. The dependency of C/N ratio on the recorded mark length was measured. The reproducing power was set to a value (2.5 to 3.5 mW) so that C/N ratio is maximized.

Table 1 shows the C/N ratios of the carrier signals recorded at 15 MHz (mark length: 30 μm), 11.25 MHz (mark length: 0.40 μm), and 9 MHz (mark length: 0.50 μm).

Then, crosstalk with an adjacent track was measured. The crosstalk was expressed as a difference between a reproduced signal in a land portion where a signal with a mark length of 1.0 μm was recorded, and the reproduced signal in an adjacent group portion. Results are shown in Table 1.

(Third Experimental Example)

A magnetooptical recording medium of the present invention comprising a readout layer, a recording layer and an intermediate layer with low Curie temperature provided therebetween was fabricated and evaluated.

The same film forming instrument and film forming method as those employed in the second experiment example were used. A SiN layer as an interference dielectric layer was deposited to a thickness of 830 Å on the surface of a polycarbonate substrate having a diameter of 130 mm and pregrooves. A GdFeCo layer (thickness: 400 Å) was deposited as a readout layer, a TbFeCoAl layer (thickness: 100 Å) was deposited as an intermediate layer, a TbFeCo layer (thickness: 300 Å) was deposited as a recording layer. Then, another SiN layer (thickness: 700 Å) was deposited as a protective dielectric layer to form a magnetooptical recording medium having the structure shown in FIG. 3(b).

When the SiN layer was formed, $N_2$ gas was introduced in addition to the Ar gas, and the deposition was performed by DC reactive sputtering. The GdFeCo layer and the TbFeCo layer were formed by applying DC power to targets of Gd, Fe, Co and Tb, respectively, and utilizing spontaneous sputtering. The compositions of those layers were controlled by adjusting the DC powers applied to the respective targets in sputtering film formation.

The composition of the GdFeCo readout layer was set so that its compensation and Curie temperatures are 250° C. and over 310° C., respectively. The composition of the TbFeCoAl intermediate layer was set so that its Curie temperature is 150° C. The composition of the TbFeCo recording layer was set so that its Curie temperature is 210° C.

The mark length dependency of C/N ratio, and crosstalk were measured by the same method as in the second experimental example. Results are shown in Table 1.

(Fourth to Seventh Experimental Examples)

Magnetooptical recording media of the present invention having a two-layer structure was fabricated by the same film forming equipment as that used in the second and third experimental examples, and the mark length dependency of C/N ratios were measured by the same method. The measured physical property values, C/N ratios and crosstalk are shown in Table 1.

(Eighth and Ninth Experimental Examples)

Magnetooptical recording media of the present invention having a three-layer structure comprising an intermediate layer with low Curie temperature were fabricated by the same film forming instrument as that used in the second to seventh experimental examples. The mark length dependencies of C/N ratios were measured by the same method as in the second to seventh experimental examples. The measured physical property values, C/N ratios and crosstalk of the respective layers are shown in Table 1.

(Tenth Experimental Example)

A magnetooptical recording medium of the present invention having a three-layer structure comprising an intermediate layer with low Curie temperature and in-plane anisotropy which was larger than that of a readout layer in a low-temperature region within an light beam spot, was fabricated by the same method as that employed in the second to ninth experimental examples.

Figure 3A:
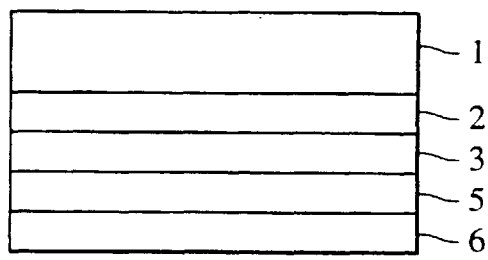
FIGS. 3(a) and (b) are schematic views showing the wholes of film structures of the present invention.
Figure 3B:
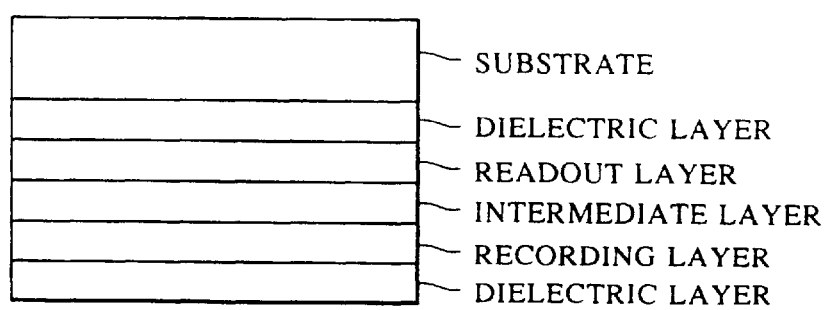

A SiN dielectric layer of 900 Å, a GdFeCo readout layer of 400 Å, a GdFe intermediate layer of 100 Å, a TbFeCo recording layer of 300 Å and a SiN protective layer were successively formed on a glass substrate to form a sample having the structure shown in FIG. 3(b). When each of the SiN layers was formed, a $N_2$ gas was introduced in addition to a Ar gas, and the deposition was performed by DC reactive sputtering. The mixing ratio between the Ar gas and $N_2$ gas was adjusted so that the refractive index is 2.1.

The composition of the GdFeCo readout layer was set so that the layer is RE-rich and has saturation magnetization Ms of 160 emu/cc at room temperature, and its compensation temperature and Curie temperature are 205° and over 300° C., respectively.

The composition of the TbFe intermediate layer was set so that the layer is RE-rich and has a saturation magnetization Ms of 520 emu/cc at room temperature, and its Curie temperature is 150° C.

The composition of the TbFeCo recording layer was set to that the layer is TM-rich and has a saturation magnetization of 200 emu/cc, and its Curie temperature is 220° C.

The dependency of the Kerr rotation angle ($\theta_K$) on an external magnetic field was measured by applying a semiconductor laser beam of 830 nm to a sample having layers, which were formed on a glass substrate by the above method, from the side of the glass substrate. The measurement was performed by heating the sample from room temperature to about 200° C. FIG. 13 shows the temperature dependency of the Kerr rotation angle (residual Kerr rotation angle: $\theta_K^R$) at the time of external magnetic field=0. It is found from FIG. 13 that the residual Kerr rotation angle $\theta_K^R$ is substantially zero from room temperature to about 140° C., then rapidly increases from about 140° C. and becomes zero at about 200° C.

(Eleventh Experimental Example)

A magnetooptical recording film having the same layer structure and layer compositions as those in the tenth experimental example was formed on a polycarbonate substrate with pregrooves to form a magnetooptical recording medium of the present invention.

The dependency of C/N ratio on the recorded mark length and crosstalk were measured by the same method as in the second to ninth experimental examples. Results are shown in Table 1.

(Twelfth Experimental Example)

A SiN dielectric layer of 900 Å, a GdFeCo readout layer of 400 Å, a GdFe intermediate layer of 120 Å, a TbFeCo recording layer of 300 Å, and a SiN protective layer of 700 Å were successively formed on a polycarbonate substrate by the same instrument and method as those employed in the first experimental example to obtain a sample having the structure shown in FIG. 3(b).

The composition of the GdFeCo readout layer was set so that the layer is RE-rich and has a saturation magnetization Ms of 180 emu/cc at room temperature, and its compensation temperature and Curie temperature are 220° C. and over 300° C., respectively.

The composition of the GdFe intermediate layer was set so that the layer is RE-rich and has a saturation magnetization Ms of 680 emu/cc at room temperature, and its Curie temperature is 180° C.

The composition of the TbFeCo recording layer was set so that the layer is TM-rich and has a saturation magnetization Ms of 200 emu/cc at room temperature, and its Curie temperature is 220° C.

Then, the dependency of C/N ratio on the recorded mark length and crosstalk were measured by the same method as in the second to ninth experimental examples. Results are shown in Table 1.

(Thirteenth Experimental Example)

A SiN dielectric layer of 900 Å, a GdFeCo readout layer of 400 Å, a GdFe intermediate layer of 80 Å, a TbFeCo recording layer of 300 Å, and a SiN protective layer of 700 Å were successively formed on a polycarbonate substrate by the same instrument and method as those employed in the first experimental example to obtain a sample having the structure shown in FIG. 3(b).

The composition of the GdFeCo readout layer was set so that the layer is RE-rich and has a saturation magnetization Ms of 150 emu/cc at room temperature, and its compensation temperature and Curie temperature are 188° C. and over 300° C., respectively.

The composition of the GdFe intermediate layer was set so that the layer is RE-rich and has a saturation magnetization Ms of 520 emu/cc at room temperature, and its Curie temperature is 170° C.

The composition of the TbFeCo recording layer was set so that the layer is TM-rich and has a saturation magnetization Ms of 200 emu/cc at room temperature, and its Curie temperature is 220° C.

Then, the dependency of C/N ratio on the recorded mark length and crosstalk were measured by the same method as in the second to ninth experimental examples. Results are shown in Table 1.

(Fourteenth Experimental Example)

A SiN dielectric layer of 900 Å, a GdFeCo readout layer of 400 Å, a GdFe intermediate layer of 90 Å, a TbFeCo recording layer of 300 Å, and a SiN protective layer of 700 Å were successively formed on a polycarbonate substrate by the same instrument and method as those employed in the first experimental example to obtain a sample having the structure shown in FIG. 3(b).

The composition of the GdFeCo readout layer was set so that the layer is RE-rich and has a saturation magnetization Ms of 160 emu/cc at room temperature, and its compensation temperature and Curie temperature are 188° C. and over 300° C., respectively.

The composition of the GdFe intermediate layer was set so that the layer is RE-rich and has a saturation magnetization Ms of 470 emu/cc at room temperature, and its Curie temperature is 165° C.

The composition of the TbFeCo recording layer was set so that the layer is TM-rich and has a saturation magnetization Ms of 200 emu/cc at room temperature, and its Curie temperature is 220° C.

Then, the dependency of C/N ratio on the recorded mark length and crosstalk were measured by the same method as in the second to ninth experimental examples. Results are shown in Table 1.

(First Comparative Experimental Example)

A SiN dielectric layer of 900 Å, a GdFeCo readout layer of 400 Å, a TbFeCo recording layer of 300 Å, and a SiN protective layer of 700 Å were successively formed on a polycarbonate substrate by the same instrument and method as those employed in the first experimental example to obtain a sample having the structure shown in FIG. 3(a).

The composition of the GdFeCo readout layer was set so that the layer is RE-rich and has a saturation magnetization Ms of 130 emu/cc at room temperature, and its compensation temperature and Curie temperature are 280° C. and about 300° C., respectively.

The composition of the TbFeCo recording layer was set so that the layer is TM-rich and has a saturation magnetization Ms of 200 emu/cc at room temperature, and its Curie temperature is 220° C.

Figure 15:
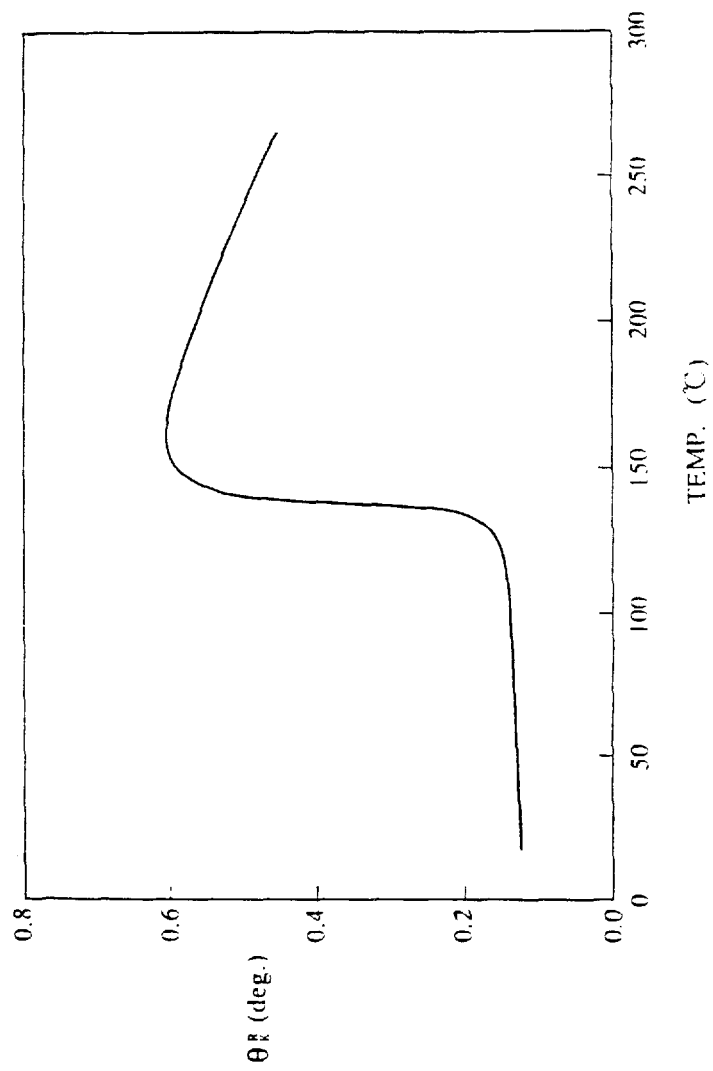
FIG. 15 is a graph illustrating an example of the temperature dependency of a residual $\theta_K$ (when a magnetic field=0) of a recording medium of a comparative example.

This sample had the temperature dependency of residual $\theta_K$ as shown in FIG. 15, and did not become again an in-plane magnetization film at high temperatures. As in this comparative example, in a recording medium having a two-layer structure comprising a readout layer and a recording layer in which the compensation temperature and Curie temperature are close to each other, the readout layer cannot be made an in-plane magnetization film at high temperatures.

(Second Comparative Experimental Example)

Layers were formed on a polycarbonate substrate to form a magnetooptical recording medium by the same method as that employed in the second experimental example. Then, the dependency of C/N ratio on the recorded mark length and crosstalk were measured by the same method as in the second to ninth experimental examples. Results are shown in Table 1.

(Third Comparative Experimental Example)

A SiN dielectric layer of 900 Å, a GdFeCo readout layer of 400 Å, a TbFeCo recording layer of 300 Å, and a SiN protective layer of 700 Å were successively formed on a polycarbonate substrate by the same instrument and method as those employed in the first experimental example to obtain a sample having the structure shown in FIG. 3(a).

The composition of the GdFeCo readout layer was set so that the layer is RE-rich and has a saturation magnetization Ms of 180 emu/cc at room temperature, and its compensation temperature and Curie temperature are 290° C. and about 300° C., respectively.

The composition of the TbFeCo recording layer was set so that the layer is TM-rich and has a saturation magnetization Ms of 200 emu/cc at room temperature, and its Curie temperature is 220° C.

Then, the dependency of C/N ratio on the recorded mark length and crosstalk were measured by the same method as in the second to ninth experimental examples. Results are shown in Table 1.

Comparison of the experimental examples 2 to 14 and comparative experimental examples 2 and 3 reveals that the present invention can significantly improve the C/N ratio and crosstalk with a short mark length.

TABLE 1

| | Readout layer | | | | Intermediate layer | | | |
|---|---|---|---|---|---|---|---|---|
| | Composition | Thick Å | Ms e/cc | $T_{com}$ °C. | Tc °C. | Composition | Thick Å | Ms e/cc | Tc °C. |
| Example 1,2 | $Gd_{31}(Fe_{55}Co_{45})_{69}$ | 400 | — | 240 | 400< | — | — | — | — |
| Example 3 | $Gd_{30}(Fe_{60}Co_{40})_{70}$ | 400 | — | 250 | 310< | $(Tb_{24}(Fe_{95}Co_5)_{76})_{95}Al_5$ | 100 | 100 | 150 |
| Example 4 | $Gd_{28}(Fe_{65}Co_{35})_{72}$ | 350 | — | 205 | 300< | — | — | — | — |
| Example 5 | $(Gd_{73}Tb_{27})_{70}Co_{30}$ | 300 | — | 205 | 300< | — | — | — | — |

TABLE 1-continued

| | | | | | | | | | |
|---|---|---|---|---|---|---|---|---|---|
| Example 6 | $Gd_{28}(Fe_{60}Co_{40})_{72}$ | 400 | — | 205 | 300< | — | — | — | — |
| Example 7 | $(Nd_{10}Gd_{90})_{30}(Fe_{60}Co_{40})_{70}$ | 370 | — | — | 300< | — | — | — | — |
| Example 8 | $Gd_{29}(Fe_{50}Co_{50})_{71}$ | 400 | — | — | 300< | $(Tb_{23}(Fe_{94}Co_6)_{77})_{94}Cu_6$ | 50 | 80 | 170 |
| Example 9 | $Gd_{28}(Fe_{70}Co_{30})_{72}$ | 360 | 260 | — | 300< | $Gd_{40}Fe_{60}$ | 80 | 460 | 188 |
| Example 10,11 | $Gd_{28}(Fe_{60}Co_{40})_{72}$ | 400 | 180 | 205 | 300< | $Gd_{45}Fe_{55}$ | 100 | 520 | 150 |
| Example 12 | $Gd_{29}(Fe_{60}Co_{40})_{71}$ | 400 | 200 | 220 | 300< | $Gd_{45}(Fe_{90}Co_{10})_{50}Al_5$ | 120 | 680 | 180 |
| Example 13 | $Gd_{27}(Fe_{68}Co_{32})_{73}$ | 400 | 150 | 188 | 300< | $Gd_{45}(Fe_{98}Co_2)_{55}$ | 80 | 520 | 170 |
| Example 14 | $Gd_{27}(Fe_{65}Co_{35})_{73}$ | 400 | 160 | 188 | 300< | $Gd_{40}(Fe_{94}Co_6)_{60}$ | 90 | 470 | 165 |
| Co. Ex. 1,2 | $Gd_{27}(Fe_{65}Co_{35})_{73}$ | 400 | 130 | 280 | 300< | — | — | — | — |
| Co. Ex. 3 | $Gd_{37}(Fe_{60}Co_{40})_{68}$ | 400 | 270 | 280 | 300< | — | — | — | — |

| | Recording layer | | | | C/N (dB) | | | |
|---|---|---|---|---|---|---|---|---|
| | Composition | Thick Å | Ms e/cc | Tc °C. | 0.30µ dB | 0.40µ dB | 0.50µ | Cross-talk dB |
| Example 1,2 | $Tb_{20}(Fe_{80}Co_{20})_{80}$ | 400 | −200 | 230 | 30 | 33 | 44 | −30 |
| Example 3 | $Tb_{20}(Fe_{80}Co_{20})_{80}$ | 300 | −200 | 210 | 36 | 41 | 47 | −35 |
| Example 4 | $Tb_{20}(Fe_{80}Co_{20})_{80}$ | 370 | −200 | 220 | 30 | 34 | 45 | −31 |
| Example 5 | $Tb_{20}(Fe_{80}Co_{20})_{80}$ | 400 | −200 | 220 | 30 | 33 | 44 | −30 |
| Example 6 | $Dy_{20}(Fe_{80}Co_{20})_{80}$ | 380 | −200 | 220 | 31 | 32 | 44 | −29 |
| Example 7 | $Tb_{20}(Fe_{80}Co_{20})_{80}$ | 400 | −200 | 220 | 30 | 31 | 46 | −28 |
| Example 8 | $Tb_{20}(Fe_{80}Co_{20})_{80}$ | 450 | −200 | 220 | 35 | 41 | 46 | −36 |
| Example 9 | $Tb_{20}(Fe_{80}Co_{20})_{80}$ | 300 | −200 | 220 | 39 | 44 | 47 | −35 |
| Example 10,11 | $Tb_{20}(Fe_{80}Co_{20})_{80}$ | 300 | −200 | 220 | 41 | 45 | 48 | −40 |
| Example 12 | $Tb_{20}(Fe_{80}Co_{20})_{80}$ | 300 | −200 | 220 | 39 | 44 | 48 | −41 |
| Example 13 | $Tb_{20}(Fe_{80}Co_{20})_{80}$ | 300 | −200 | 220 | 40 | 45 | 48 | −40 |
| Example 14 | $Tb_{20}(Fe_{80}Co_{20})_{80}$ | 300 | −200 | 220 | 40 | 44 | 48 | −41 |
| Co. Ex. 1,2 | $Tb_{20}(Fe_{80}Co_{20})_{80}$ | 300 | −200 | 220 | 20 | 26 | 46 | −20 |
| Co. Ex. 3 | $Tb_{20}(Fe_{80}Co_{20})_{80}$ | 300 | −200 | 220 | 26 | 29 | 47 | −21 | e/cc = emu/cc

Use of the magnetooptical recording medium and reproducing method of the present invention enable reproduction of a magnetic domain smaller than the diameter of a beam spot by using a simple instrument (conventional instrument) which requires no initialization magnet, and achievement of high-density recording in which the linear recording density and track density are further improved, thereby improving the C/N ratio.

What is claimed is:

1. A magnetooptical recording medium adapted to be heated from a room temperature range to a medium temperature range above the room temperature range and to a high temperature range above the medium temperature range, said medium comprising:

a first magnetic layer, which has an in-plane magnetization at the room temperature range, and which changes to a perpendicular magnetization at the medium temperature range;

a second magnetic layer having a perpendicular magnetization; and a third magnetic layer, wherein the third magnetic layer is interposed between said first and second magnetic layers, and has a Curie temperature lower than those of said first and second magnetic layers, and has an in-plane magnetization at the room temperature range and changes to a perpendicular magnetization at the medium temperature range.

2. A method of reproducing, with a laser beam, information recorded on a magnetooptical recording medium comprising a first magnetic layer, a second magnetic layer having a perpendicular magnetization, and an intermediate layer therebetween having a Curie temperature higher than a room temperature range, lower than the Curie temperature of the first and second magnetic layers, and in a high temperature range, the first magnetic layer having an in-plane magnetization at the room temperature range, changing to a perpendicular magnetization at a medium temperature range higher than the room temperature range and changing back to an in-plane magnetization at or above the Curie temperature of the intermediate layer in the high temperature range higher than the medium temperature range, said method comprising the steps of:

projecting a laser beam onto the magnetooptical recording medium from a side of the first magnetic layer;

heating the first magnetic layer with the laser beam so that the first magnetic layer has a portion in the room temperature range having in-plane magnetization and a portion in the medium temperature range having a perpendicular magnetization;

heating a portion of the intermediate layer at least to its Curie temperature so that a corresponding portion of the first magnetic layer in the high temperature range changes to an in-plane magnetization;

transferring information recorded in the second magnetic layer to the first magnetic layer by exchange coupling through the intermediate layer perpendicular magnetization of the first magnetic layer and magnetization of the second magnetic layer; and reproducing the recorded information based on the magneto-optic effect of the light reflected from the magnetooptical recording medium.

* * * * *

UNITED STATES PATENT AND TRADEMARK OFFICE
CERTIFICATE OF CORRECTION

PATENT NO. : 5,831,944

DATED : November 3, 1998

INVENTOR(S) : NAOKI NISHIMURA

It is certified that error appears in the above-identified patent and that said Letters Patent is hereby corrected as shown below:

On the title page,

Item [56] FOREIGN PATENT DOCUMENTS:

"2/1993" should read --1/1993--.
"Takashi et al." should read --Takahashi et al.--.
"Murakami" should read --Murakami et al.--.

COLUMN 1:

Line 31, "a" should be deleted.

COLUMN 2:

Line 33, "reproducable" should read --reproducible--.

COLUMN 6:

Line 46, "or" should read --are--.

COLUMN 8:

Line 2, and "applies" should read --applies to--.

UNITED STATES PATENT AND TRADEMARK OFFICE
CERTIFICATE OF CORRECTION

PATENT NO. : 5,831,944

DATED : November 3, 1998

INVENTOR(S) : NAOKI NISHIMURA

It is certified that error appears in the above-identified patent and that said Letters Patent is hereby corrected as shown below:

<u>COLUMN 9</u>:

Line 48, "shows" should read --show--.

<u>COLUMN 10</u>:

Line 64, "stepwisely applied." should read --applied stepwise.--

<u>COLUMN 12</u>:

Line 21, "to" should read --so--.

Signed and Sealed this

Twelfth Day of October, 1999

Attest:

Q. TODD DICKINSON

*Attesting Officer*     *Acting Commissioner of Patents and Trademarks*